US010253207B2

(12) United States Patent
Hughes

(10) Patent No.: US 10,253,207 B2
(45) Date of Patent: Apr. 9, 2019

(54) STRESS-RESISTANT EXTRUDATES

(71) Applicant: Roderick Hughes, Newport Beach, CA (US)

(72) Inventor: Roderick Hughes, Newport Beach, CA (US)

( * ) Notice: Subject to any disclaimer, the term of this patent is extended or adjusted under 35 U.S.C. 154(b) by 0 days.

(21) Appl. No.: 15/487,194

(22) Filed: Apr. 13, 2017

(65) Prior Publication Data

US 2017/0283647 A1  Oct. 5, 2017

Related U.S. Application Data

(63) Continuation-in-part of application No. 14/474,581, filed on Sep. 2, 2014, now abandoned.

(Continued)

(51) Int. Cl.

| | |
|---|---|
| *C09D 167/03* | (2006.01) |
| *C08L 23/08* | (2006.01) |
| *C08L 23/28* | (2006.01) |
| *C08L 25/08* | (2006.01) |
| *C08L 25/12* | (2006.01) |
| *C08L 67/02* | (2006.01) |
| *C08L 67/03* | (2006.01) |
| *C09D 123/08* | (2006.01) |
| *C09D 123/28* | (2006.01) |
| *C09D 125/12* | (2006.01) |
| *C09D 125/08* | (2006.01) |
| *C09D 167/02* | (2006.01) |
| *C09D 167/08* | (2006.01) |
| *B32B 21/08* | (2006.01) |
| *B32B 27/06* | (2006.01) |

(Continued)

(52) U.S. Cl.
CPC ............ *C09D 167/02* (2013.01); *C08L 67/02* (2013.01); *C09D 7/48* (2018.01); *C09D 7/61* (2018.01); *C09D 7/65* (2018.01); *C09D 125/12* (2013.01); *C09D 133/20* (2013.01); *B32B 21/08* (2013.01); *B32B 27/06* (2013.01); *B32B 27/08* (2013.01); *B32B 27/12* (2013.01); *B32B 27/18* (2013.01); *B32B 27/20* (2013.01); *B32B 27/30* (2013.01); *B32B 27/302* (2013.01); *B32B 27/32* (2013.01); *B32B 27/322* (2013.01); *B32B 27/36* (2013.01); *B32B 2255/10* (2013.01); *B32B 2307/50* (2013.01); *B32B 2307/558* (2013.01); *B32B 2307/58* (2013.01); *B32B 2307/712* (2013.01); *B32B 2323/04* (2013.01); *B32B 2325/00* (2013.01); *B32B 2367/00* (2013.01); *B32B 2419/00* (2013.01); *C08L 23/08* (2013.01); *C08L 23/28* (2013.01); *C08L 23/286* (2013.01); *C08L 25/08* (2013.01); *C08L 25/12* (2013.01); *C08L 67/03* (2013.01); *C09D 123/08* (2013.01); *C09D 123/28* (2013.01); *C09D 123/286* (2013.01); *C09D 125/08* (2013.01); *C09D 167/03* (2013.01); *Y10T 428/3179* (2015.04); *Y10T 428/3188* (2015.04); *Y10T 428/31786* (2015.04); *Y10T 428/31855* (2015.04); *Y10T 428/31895* (2015.04); *Y10T 428/31899* (2015.04); *Y10T 428/31902* (2015.04); *Y10T 428/31906* (2015.04)

(58) Field of Classification Search
None
See application file for complete search history.

(56) References Cited

U.S. PATENT DOCUMENTS

| | | | |
|---|---|---|---|
| 2,991,273 A | 4/1961 | Hechelhammer et al. | |
| 3,028,365 A | 4/1962 | Schnell et al. | |

(Continued)

FOREIGN PATENT DOCUMENTS

| | | | |
|---|---|---|---|
| EP | 0 379 255 A | * | 7/1990 |
| EP | 1858943 B1 | | 2/2011 |

(Continued)

OTHER PUBLICATIONS

"Novista Chlorinated Polyethylene Impact Modifier" (2011) (http://www.novistagroup.com/eneirong.asp?id=199) (webpage retrieved Sep. 25, 2017).*

(Continued)

*Primary Examiner* — Vivian Chen
(74) *Attorney, Agent, or Firm* — Stout, Uxa & Buyan, LLP; Carlos A. Fisher

(57) ABSTRACT

Compositions and articles comprising a stress and crack resistant component comprising a thermoplastic component and an elongation component. In some examples, the invention is directed to a stress and crack resistant component comprising a thermoplastic component, an elongation modifier component and an elongation temperer; in preferred examples the thermoplastic component comprises a polyethylene terephthalate glycol-modified (PETG) copolyester, the elongation modifier component comprises a halogenated polyolefin having a heat of fusion of 1 J/g or less, and the elongation temperer comprises a polystyrene acrylonitrile) (SAN). In preferred examples the stress-resistant component is comprised as a coating component covering at least one surface of a substrate, such as one comprising a medium density fiberboard (MDF), a particle board, an oriented strand board, fiberglass, a natural wood, a composite wood product, and a synthetic substrate. The stress-resistant component is preferably, though not invariably, produced by extrusion. The invention is also directed to articles, such as extrusion profiles, comprising the stress-resistant component, and methods of making such articles.

9 Claims, No Drawings

Related U.S. Application Data

(60) Provisional application No. 61/873,749, filed on Sep. 4, 2013, provisional application No. 61/873,733, filed on Sep. 4, 2013.

(51) Int. Cl.

| | | |
|---|---|---|
| *B32B 27/08* | (2006.01) | |
| *B32B 27/12* | (2006.01) | |
| *B32B 27/18* | (2006.01) | |
| *B32B 27/20* | (2006.01) | |
| *B32B 27/30* | (2006.01) | |
| *B32B 27/32* | (2006.01) | |
| *B32B 27/36* | (2006.01) | |
| *C09D 133/20* | (2006.01) | |
| *C09D 7/61* | (2018.01) | |
| *C09D 7/48* | (2018.01) | |
| *C09D 7/65* | (2018.01) | |

(56) References Cited

U.S. PATENT DOCUMENTS

| | | | |
|---|---|---|---|
| 2,999,846 A | 9/1962 | Schnell et al. | |
| 3,148,172 A | 9/1964 | Fox et al. | |
| 3,153,008 A | 10/1964 | Fox et al. | |
| 3,169,121 A | 2/1965 | Goldberg et al. | |
| 3,207,814 A | 9/1965 | Goldberg et al. | |
| 3,271,367 A | 9/1966 | Schnell et al. | |
| 4,148,956 A * | 4/1979 | Breitenfellner | C08L 67/02 428/156 |
| 4,156,069 A | 5/1979 | Prevorsek et al. | |
| 1,494,038 A | 3/1980 | Baker et al. | |
| 4,430,484 A | 2/1984 | Quinn | |
| 4,465,820 A | 8/1984 | Miller et al. | |
| 4,547,554 A * | 10/1985 | Kadomatsu | C08F 8/22 525/334.1 |
| 4,767,823 A * | 8/1988 | Jones | C08F 8/20 525/334.1 |
| 4,981,898 A | 1/1991 | Bassett | |
| 4,982,014 A | 1/1991 | Freitag et al. | |
| 4,987,187 A * | 1/1991 | Udipi | C08L 67/02 525/173 |
| 5,010,162 A | 4/1991 | Serini et al. | |
| 5,106,897 A * | 4/1992 | Chen | C08L 25/12 524/210 |
| 5,210,134 A * | 5/1993 | Akkapeddi | C08F 257/02 525/166 |
| 5,403,892 A * | 4/1995 | Puydak | C08L 23/04 525/192 |
| 5,882,564 A | 3/1999 | Puppin | |
| 6,153,293 A | 11/2000 | Dahl et al. | |
| 6,346,160 B1 | 2/2002 | Puppin | |
| 6,660,086 B1 | 12/2003 | Prince et al. | |
| 7,374,795 B2 | 5/2008 | Prince et al. | |
| 8,048,362 B2 | 11/2011 | Suzuki et al. | |
| 8,124,234 B2 | 2/2012 | Weaver et al. | |
| 2002/0042464 A1 * | 4/2002 | Barclay | C08K 3/0008 524/425 |
| 2002/0086940 A1 | 7/2002 | Ota et al. | |
| 2003/0021915 A1 | 1/2003 | Rohatgi et al. | |
| 2004/0039119 A1 * | 2/2004 | Berard | C08L 27/06 525/70 |
| 2006/0167183 A1 | 7/2006 | Ouhadi et al. | |
| 2008/0241769 A1 * | 10/2008 | Quintens | B29C 55/005 430/349 |
| 2009/0270543 A1 * | 10/2009 | Mongoin | C08F 265/00 524/426 |
| 2010/0015456 A1 * | 1/2010 | Lizotte | B05D 7/08 428/480 |
| 2010/0112250 A1 | 3/2010 | Shelby et al. | |
| 2010/0233146 A1 * | 9/2010 | McDaniel | A01N 63/02 424/94.2 |
| 2010/0279113 A1 | 11/2010 | Attal et al. | |
| 2011/0195148 A1 * | 8/2011 | Mentink | C08G 18/6484 426/3 |
| 2011/0223342 A1 | 9/2011 | Iyer et al. | |
| 2013/0001156 A1 | 1/2013 | Lizotte et al. | |
| 2013/0005892 A1 | 1/2013 | Lizotte et al. | |
| 2015/0086800 A1 * | 3/2015 | Hughes | C08L 67/02 428/481 |

FOREIGN PATENT DOCUMENTS

| | | |
|---|---|---|
| EP | 2562318 A1 | 2/2013 |
| WO | WO 2007/050230 A * | 5/2007 |

OTHER PUBLICATIONS

La Mantia, Francesco Paolo. "Recycled Plastics: Additives and Their Effects on Properties" Plastic Additives (1998) (in Polymer Science and Technology Series, vol. 1., Pritchard G. (eds)). pp. 535-543.*

FarshidIranmanesh. "A Review on Mechanical Properties and Applications of Chlorinated Poyethylene." Advances in Environmental Biology, 6(2), pp. 530-533. (2012).*

\* cited by examiner

STRESS-RESISTANT EXTRUDATES

REFERENCE TO RELATED APPLICATIONS

The present patent application is a continuation in part of U.S. patent application Ser. No. 14/474,581, filed Sep. 2, 2014, abandoned which claimed the benefit of priority to U.S. Provisional Patent Application Ser. No. 61/873,733, filed Sep. 4, 2013 and U.S. Provisional patent application Ser. No. 61/873,749, filed Sep. 4, 2013, each of which is hereby specifically incorporated by reference herein in its entirety.

INVENTION AND BACKGROUND

The present invention relates to thermoplastic compositions and related methods that are useful for extrusion; for example, thermoplastic extrudate compositions and extrusion coatings on various substrates, such as wood, medium density fiberboard (MDF), and synthetic substrates, articles comprising a substrate coated with the thermoplastic compositions and processes for making the articles. The compositions exhibit significant and enhanced resistance to stress, such as resistance to cracking due to extremes of heat and cold or that cracking caused by swelling due to absorption of water by the substrate or drying out of the substrate. Additionally, the compositions possess excellent mechanical properties for fabrication (cutting, nailing, routing, etc.), while maintaining acceptable visual appearance, including gloss, and surface appearance.

Manufacturers of thermoplastic compositions, such as composite compositions for horizontal blinds, indoor shutter parts, window framing, rails, doors, door frames, molding, trim and the like, have long struggled to develop compositions that exhibit enhanced mechanical properties for fabrication (hardness, toughness, lack of brittleness, scratch resistance, ability to be cut, nailed, routed, etc. without deformation or loss of structural strength), while maintaining acceptable visual appearance, including opacity, gloss, and an attractive surface appearance. By toughness is meant "a physical parameter balancing ductility and strength." Such compositions may be comprised in, for example stress-resistant components capable of coating a variety of substrates. Other exemplary uses of such stress-resistant compositions include as a sole or primary component of a thermoplastic extrudate.

One of the most common coatings for MDF interior molding and trim available in the North American market is known as a Gesso coating. Gesso, typically used by suppliers from South America or Asia, is a thick paste that is applied using a wipe-on/wipe-off type process. Drying after coating is required, and a second coating is often applied to provide the surface with a desired look; the second coating must also be dried and buffed. Thus, Gesso coating is relatively labor intensive. Furthermore, although the Gesso coating can yield a smooth, attractive finished surface that is able to hide at least minor imperfections in the surface of the underlying substrate, it can be brittle. Brittleness of the coating may lead to unacceptable handling and fabrication performance such as cracking and splintering, for example, when the molding or trim is sawed, mitered, coped, nailed, and/or routed, or when subject to environmental conditions such as high moisture, heat and cold.

Recently attempts have been made to make thermoplastic coating components that provide good handling ability, and cosmetic appearance, particularly with attention to the ability of the coating component to accept water-based paint.

Thus, U.S. patent application Ser. Nos. 12/503,675, 13/616,681, and 13/616,672 all disclose polymer coating components; these compositions are primarily suggested for enhanced paintability, including paintability using water-based paints, and comprise at least about 40% of a thermoplastic component and optional gloss, and/or opacity components; articles coated with such compositions, including painted coated articles, are also described. However, such articles still exhibit unacceptable cracking and splintering when subjected to the extremes of heat, cold, and water that would be expected, for example, upon prolonged exposure to the exterior environment.

U.S. Pat. No. 5,728,772 to Hori describes a moldable thermoplastic elastomer composition comprising a specific thermoplastic polyester elastomer alloy having comprising a copolymer having hard segments "soft segments" and a chlorinated polyethylene composition having a heat of fusion from 5 to 35 cal/g and elongation to break moduli of 670% and greater, for interior surface materials for automobiles and buildings, boots, cable coatings and other parts which are required to have rubber elasticity and heat resistance, such as packings.

U.S. Patent Publication 2004/0097650 (Ogawa) discloses a soft olefin-based moldable thermoplastic elastomer composition and having an elongation to break modulus of greater than 1000% for interior parts for automobiles.

U.S. Patent Publication 2010/0233146 (McDaniels) discloses a coating, an elastomer, an adhesive, a sealant, a textile finish, a wax, and a filler for such a material, wherein the material includes an enzyme such as an esterase.

U.S. Pat. No. 6,300,418 (to Brzoskowski) discloses an adhesive thermoplastic elastomer composition comprising either a blend of a thermoplastic resin and a rubber, or a thermoplastic elastomeric styrene-based block copolymer having elongation to break values of over 500%.

Accordingly, there remains a need in the art for compositions exhibiting improved resistance to stress—UV—or heat related cracking and fracturing under environmental conditions. Such compositions include coating components that, when applied to an underlying substrate, such as, for example, molding or trim, using extrusion technology, can result in a enhanced toughness and ductility and which also have acceptable visual appearance and scratch resistance. Preferably, such compositions also can be produced in such a way that they have a smooth finish and to have improved ability to be primed and painted, with water-based or oil-based paints.

SUMMARY OF THE INVENTION

Certain examples of the present invention provide thermoplastic component-based compositions and coating comprising additives designed to improve mechanical properties (e.g., ductility, hardness durability and toughness), while maintaining acceptable visual appearance, including at least one of opacity, stress and gloss, surface appearance. In certain examples, the compositions and coatings of the invention provide enhanced paintability (e.g., adhesion of an water-based paint to its surface). By "coat", "coating" or similar related words is meant that the outer surface of a substrate is either completely or partially covered with another material. In some cases the invention is drawn to articles comprising a component having a percent elongation to break of between about 131% and about 300%, wherein the component comprises a thermoplastic polymer component and an elongation modifier component. Such articles may be, for example, partially or wholly coated with the component, or may, for example, be comprised entirely or substantially entirely of such component.

By "percent elongation to break" or "percent elongation at break" is meant the percentage increase in length that occurs before a test specimen having a thickness of ⅛ inches breaks when is pulled from both ends in a tensile testing machine under appropriate test conditions, such as those reported in the ASTM (American Society for Testing and Materials) D638 and ISO (International Organization for Standardization) 527 tensile tests. Polyolefins have elongation to break percentages up to about 500%, and elastomers have elongation to break percentages of up to about 1000%; acrylic polymers and styrene acrylonitrile (SAN) have quite low elongations to break. The term "elongation to yield" means the amount of recoverable elongation the material undergoes before it begins to become deformed or is otherwise subject to irreversible flow processes. As used in the present specification "tensile strength" means the maximum amount of force applied to a material before it breaks or tears. By "elongation modifier" or "elongation component" is meant a polymeric material which, when added to a thermoplastic component and optionally, an elongation temperer, causes the resulting composition to have an elongation to break percentage of at least 131%, or between about 150% and about 300%; or between about 175% and about 300%; or between about 200% and about 300%, or between about 200% and about 275%, or between about 225% and about 300%, or between about 225% and about 275%, or about 250%. By the term "elongation temperer" is meant an additive that, when added to a thermoplastic component and an elongation component, causes the resulting composition to have a lower elongation to break than would an otherwise identical composition lacking the elongation temperer. Thus, the elongation temperer is used to harden the compositions when they are too soft. Unless otherwise indicated, values for these terms and others concerning the mechanical properties of polymers shall be deemed to have been conducted according to the conditions set forth in the ASTM D638 tensile test.

One example of the present invention provides stress- and crack-resistant components, such as stress- and crack resistant coating components, having a percent elongation to break of at least 131%, or between about 150% and about 300%; or between about 175% and about 300%; or between about 200% and about 300%, or between about 200% and about 275%, or between about 225% and about 300%, or between about 225% and about 275%, or about 250%, and that comprise at least one thermoplastic component, at least one elongation modifier, and optionally at least one elongation temperer, and optionally at least one opacity modifier component, and optionally at least one gloss modifier component. These compositions exhibit at least one of enhanced mechanical properties for fabrication (cutting, nailing, routing, etc.), enhanced resistance to stress-related cracking and fracturing under environmental conditions, and enhanced durability, while maintaining acceptable visual appearance.

One example according to the present invention comprises a stress-resistant coating component having a percent elongation to break of at least 131%; or between about 131% and about 300%; or between about 150% and about 300%; or between about 175% and about 300%; or between about 200% and about 300%, or between about 200% and about 275%, or between about 225% and about 300%, or between about 225% and about 275%, or about 250%, and comprising a thermoplastic component, an elongation component, and optionally at least one elongation temperer; wherein the coating is an extruded coating, wherein the thermoplastic component has a solubility parameter ranging from about 9.4 to about 14.0 $(cal/cm^3)^{0.5}$; and wherein the thermoplastic component has a Tg greater than about 70° C. and less than about 150° C.

In one example the stress-resistant component has an percent elongation to break of at least 131%, preferably between about 150% and about 300%; or between about 175% and about 300%; or between about 200% and about 300%, or between about 200% and about 275%, or between about 225% and about 300%, or between about 225% and about 275%, or about 250%, and comprises a thermoplastic component selected from the group consisting of polyesters which includes copolyesters, polycarbonates, polymethyl methacrylate (PMMA), poly(acrylonitrile-styrene-acrylate) (ASA), poly(acrylonitrile-butadiene-styrene) (ABS), cellulose esters and mixtures thereof.

In one example the stress-resistant component has an percent elongation to break of at least 131%, or between about 150% and about 300%; or between about 175% and about 300%; or between about 200% and about 300%, or between about 200% and about 275%, or between about 225% and about 300%, or between about 225% and about 275%, or about 250%, and comprises a copolyester comprising at least 80 mole % acid residues from terephthalic acid, derivatives of terephthalic acid and mixtures thereof, at least 80 mole % glycol residues from ethylene glycol and 1,4-cyclohexanedimethanol, wherein the acid residues are based on 100 mole % acid residues and the glycol residues are based on 100 mole % glycol residues, and at least one elongation component.

In one example the stress-resistant component has an percent elongation to break of at least 131%, or between about 150% and about 300%; or between about 175% and about 300%; or between about 200% and about 300%, or between about 200% and about 275%, or between about 225% and about 300%, or between about 225% and about 275%, or about 250%, and comprises a polyester comprising 70 to 100 mole % acid residues from terephthalic acid, 0 to 30 mole % aromatic dicarboxylic acid residues having up to 20 carbon atoms, and 0 to 10 mole % of aliphatic dicarboxylic acid residues having up to 16 carbon atoms wherein the acid residues are based on 100 mole % acid residue; and at least one elongation component. In one example the stress-resistant component comprises a polyester comprising 80 to 100 mole % acid residues from terephthalic acid, 0 to 20 mole % aromatic dicarboxylic acid residues having up to 20 carbon atoms, and 0 to 10 mole % of aliphatic dicarboxylic acid residues having up to 16 carbon atoms wherein the acid residues are based on 100 mole % acid residues. In one example the stress-resistant component comprises a polyester comprising 90 to 100 mole % acid residues from terephthalic acid, 0 to 10 mole % aromatic dicarboxylic acid residues having up to 20 carbon atoms, and 0 to 10 mole % of aliphatic dicarboxylic acid residues having up to 16 carbon atoms wherein the acid residues are based on 100 mole % acid residues; and at least one elongation component. Preferably the polyester comprises a PETG polymer.

In another example the stress-resistant component comprises a polymeric elongation modifier component having a percent elongation at break of at least 131%, preferably between about 131% and about 300%; or between about 150% and about 300%; or between about 175% and about 300%; or between about 200% and about 300%, or between about 200% and about 275%, or between about 225% and about 300%, or between about 225% and about 275%, or about 250%. Such elongation modifier components may include, without limitation: substituted or un-substituted polyolefins (including halogenated polyolefins), plasticized polyvinyl halides, styrene-butadiene polymers (SBC), styrene-butadiene-styrene (SBS) polymers, methacrylate-butadiene-styrene (MBS) polymers, styrene-butadiene-rubber (SBR) polymers, enhanced rubber segment (ERS) polymers, styrene-isoprene (SIS) polymers, styrene isoprene/butylene styrene polymers, styrene-ethylene/butylene-styrene (SEBS) polymers, styrene-ethylene/propylene (SEP) polymers, chlorinated polyethylene/acrylate (CPE/acrylic) polymers, and acrylonitrile styrene acrylate (ASA) polymers, and acrylonitrile ethylene styrene (AES) polymers, and mixtures of two or more of these polymers.

In one example the stress-resistant component comprises a thermoplastic component comprising (A) one or more polymer selected from the group consisting of polyesters which includes copolyesters, polycarbonates, polymethyl methacrylate (PMMA), poly(acrylonitrile-styrene-acrylate) (ASA), poly(acrylonitrile-butadiene-styrene) (ABS), poly(styrene-acrylonitrile) (SAN), cellulose esters and mixtures thereof, and (B) a polymeric elongation modifier component. Elongation modifier components may include, without limitation: substituted or un-substituted polyolefins (including halogenated polyolefins), plasticized polyvinyl halides, styrene-butadiene polymers (SBC), styrene-butadiene-styrene (SBS) polymers, methacrylate-butadiene-styrene (MBS) polymers, styrene-butadiene-rubber (SBR) polymers, enhanced rubber segment (ERS) polymers, styrene-isoprene (SIS) polymers, styrene isoprene/butylene styrene polymers, styrene-ethylene/butylene-styrene (SEBS) polymers, styrene-ethylene/propylene (SEP) polymers, chlorinated polyethylene/acrylate (CPE/acrylic) polymers, and acrylonitrile styrene acrylate (ASA) polymers, and acrylonitrile ethylene styrene (AES) polymers, and mixtures of two or more of these polymers.

In one example the present invention provides an article comprising: a polymer selected from the group consisting of polyesters which includes copolyesters, polycarbonates, polymethyl methacrylate (PMMA), poly(acrylonitrile-styrene-acrylate) (ASA), poly(acrylonitrile-butadiene-styrene) (ABS), cellulose esters and mixtures thereof, a polymeric elongation modifier component, and an elongation temperer component. Such elongation modifier components may include, without limitation: substituted or un-substituted polyolefins (including halogenated polyolefins), plasticized polyvinyl halides, styrene-butadiene polymers (SBC), styrene-butadiene-styrene (SBS) polymers, methacrylate-butadiene-styrene (MBS) polymers, styrene-butadiene-rubber (SBR) polymers, enhanced rubber segment (ERS) polymers, styrene-isoprene (SIS) polymers, styrene isoprene/butylene styrene polymers, styrene-ethylene/butylene-styrene (SEBS) polymers, styrene-ethylene/propylene (SEP) polymers, chlorinated polyethylene/acrylate (CPE/acrylic) polymers, and acrylonitrile styrene acrylate (ASA) polymers and acrylonitrile ethylene styrene (AES) polymers, and mixtures of two or more of these polymers. Elongation temperer components may include poly(styrene acrylonitrile) (SAN), acrylic polymers, and rigid polyvinyl chloride compound. The article may, for example, be substantially comprised of the mixture comprising the polymeric component, the elongation modifier component and the elongation temperer component, or may be coated with said mixture.

In another example the present invention provides an article comprising a component having a percent elongation at break of at least 131%, between about 131% and about 300%, preferably between about 150% and about 300%; or between about 175% and about 300%; or between about 200% and about 300%, or between about 200% and about 275%, or between about 225% and about 300%, or between about 225% and about 275%, or about 250%, said component comprising a polyester component comprising: (a) at least 80 mole % acid residues from terephthalic acid, derivatives of terephthalic acid and mixtures thereof, (b) at least 80 mole % glycol residues from ethylene glycol and 1,4-cyclohexanedimethanol, wherein the acid residues are based on 100 mole % acid residues and the glycol residues are based on 100 mole % glycol residues, plus an elongation modifier component and optionally, an elongation temperer component. Such elongation modifier components may include, without limitation: substituted or un-substituted polyolefins (including halogenated polyolefins), plasticized polyvinyl halides, styrene-butadiene polymers (SBC), styrene-butadiene-styrene (SBS) polymers, methacrylate-butadiene-styrene (MBS) polymers, styrene-butadiene-rubber (SBR) polymers, enhanced rubber segment (ERS) polymers, styrene-isoprene (SIS) polymers, styrene isoprene/butylene styrene polymers, styrene-ethylene/butylene-styrene (SEBS) polymers, styrene-ethylene/propylene (SEP) polymers, chlorinated polyethylene/acrylate (CPE/acrylic) polymers, and acrylonitrile styrene acrylate (ASA) polymers and acrylonitrile ethylene styrene (AES) polymers, and mixtures of two or more of these polymers. Elongation temperer components may include poly(styrene acrylonitrile)(SAN), acrylic polymers, and rigid polyvinyl chloride compound and mixtures of two or more of these polymers.

In another example the present invention provides an article a least partially coated with a stress-resistant component, said stress-resistant component having a percent elongation at break of at least 131%, or between about 131% and about 300%, or preferably between about 150% and about 300%; or between about 175% and about 300%; or between about 200% and about 300%, or between about 200% and about 275%, or between about 225% and about 300%, or between about 225% and about 275%, or about 250%, and comprising an elongation modifier, an elongation temperer, and a polyester component comprising: (a) at least 80 mole % acid residues from terephthalic acid, derivatives of terephthalic acid and mixtures thereof, (b) at least 80 mole % glycol residues from ethylene glycol and 1,4-cyclohexanedimethanol, wherein the acid residues are based on 100 mole % acid residues and the glycol residues are based on 100 mole % glycol residues, and an elongation modifier component. Such elongation modifier components may include, without limitation: substituted or un-substituted polyolefins (including halogenated polyolefins), plasticized polyvinyl halides, styrene-butadiene polymers (SBC), styrene-butadiene-styrene (SBS) polymers, methacrylate-butadiene-styrene (MBS) polymers, styrene-butadiene-rubber (SBR) polymers, enhanced rubber segment (ERS) polymers, styrene-isoprene (SIS) polymers, styrene isoprene butylene styrene polymers, styrene-ethylene/butylene-styrene (SEBS) polymers, styrene-ethylene/propylene (SEP) polymers, chlorinated polyethylene acrylate (CPE/acrylic) polymers, and acrylonitrile styrene acrylate (ASA) polymers and acrylonitrile ethylene styrene (AES) polymers, and mixtures of two or more of these polymers. Elongation temperer components may include poly(styrene acrylonitrile) (SAN), acrylic polymers, and rigid polyvinyl chloride compound and mixtures of two or more of these polymers.

In another example the present invention provides an article at least partially coated with a stress-resistant coating component, said coating component having a percent elongation at break of at least 131%, or between about 131% and about 300%, or preferably between about 150% and about 300%; or between about 175% and about 300%; or between about 200% and about 300%, or between about 200% and about 275%, or between about 225% and about 300%, or between about 225% and about 275%, or about 250%, and comprising (A) a polyester component comprising: (i) an acid component comprising: (a) at least 70 mole % acid residues from terephthalic acid, derivatives of terephthalic acid and mixtures thereof; (b) from 0 to 30 mole % acid residues from aromatic dicarboxylic acids; and (c) from 0 to 10 mole % acid residues from aliphatic dicarboxylic acids having up to 20 carbon atoms; and (ii) a glycol component comprising: (a) from 20 to 70 mole % glycol residues from cyclohexanedimethanol; (b) from 0 to 80 mole % glycol residues from ethylene glycol; and (c) from 0 to 80 mole % glycol residues from glycols having up to 20 carbon atoms, wherein the acid residues are based on 100 mole % acid residues and the glycol residues are based on 100 mole % glycol residues, (B) an elongation modifier component, and preferably an elongation temperer component. Such elongation modifier components may include, without limitation: substituted or un-substituted polyolefins (including halogenated polyolefins), plasticized polyvinyl halides, styrene-butadiene polymers (SBC), styrene-butadiene-styrene (SBS) polymers, methacrylate-butadiene-styrene (MBS) polymers, styrene-butadiene-rubber (SBR) polymers, enhanced robber segment (ERS) polymers, styrene-isoprene (SIS) polymers, styrene isoprene/butylene styrene polymers, styrene-ethylene/butylene-styrene (SEBS) polymers, styrene-ethylene/propylene (SEP) polymers, chlorinated polyethylene/acrylate (CPE/acrylic) polymers, and acrylonitrile styrene acrylate (ASA) polymers and acrylonitrile ethylene styrene (AES) polymers, and mixtures of two or more of these polymers. Elongation temperer components may include poly(styrene acrylonitrile) (SAN), acrylic polymers, and rigid polyvinyl chloride compound and mixtures of two or more of these polymers.

In another example the present invention provides an article comprising a component having a percent elongation at break of at least 131%, or between about 131% and about 300%, or preferably between about 150% and about 300%; or between about 175% and about 300%; or between about 200% and about 300%, or between about 200% and about 275%, or between about 225% and about 300%, or between about 225% and about 275%, or about 250%, and comprising (A) a polyester comprising: (i) an acid component comprising: (a) at least 70 mole % acid residues from terephthalic acid, derivatives of terephthalic acid and mixtures thereof; (b) from 0 to 30 mole % acid residues from aromatic dicarboxylic acids; and (c) from 0 to 10 mole % acid residues from aliphatic dicarboxylic acids having up to 20 carbon atoms; (ii) a glycol component comprising: (a) from 20 to 81 mole % glycol residues from cyclohexanedimethanol; (b) from 0 to 80 mole % glycol residues from ethylene glycol; and (c) from 0 to 80 mole % glycol residues from glycols having up to 20 carbon atoms, wherein the acid residues are based on 100 mole % acid residues and the glycol residues are based on 100 mole % glycol residues, (B) an elongation modifier component, and C) an elongation temperer component.

In another example the present invention provides an article at least partially coated with a coating component, said coating component having a percent elongation at break of at least 131%, or between about 131% and about 300%, or preferably between about 150% and about 300%; or between about 175% and about 300%; or between about 200% and about 300%, or between about 200% and about 275%, or between about 225% and about 300%, or between about 225% and about 275%, or about 250% and comprising (A) a polyester comprising: (i) an acid component comprising: (a) at least 70 mole % acid residues from terephthalic acid, derivatives of terephthalic acid and mixtures thereof; (b) from 0 to 30 mole % acid residues from aromatic dicarboxylic acids; and (c) from 0 to 10 mole % acid residues from aliphatic dicarboxylic acids having up to 20 carbon atoms; (ii) a glycol component comprising: (a) from 20 to 81 mole % glycol residues from cyclohexanedimethanol; (b) from 0 to 80 mole % glycol residues from ethylene glycol; and (c) from 0 to 80 mole % glycol residues from glycols having up to 20 carbon atoms, wherein the acid residues are based on 100 mole % acid residues and the glycol residues are based on 100 mole % glycol residues, (B) an elongation modifier component including one or more of the following: a substituted or un-substituted polyolefin (including halogenated polyolefins), a plasticized polyvinyl halide, a styrene-butadiene polymer (SBC), a styrene-butadiene-styrene (SBS) polymer, a methacrylate-butadiene-styrene (MBS) polymer, a styrene-butadiene-rubber (SBR) polymer, an enhanced rubber segment (ERS) polymer, a styrene-isoprene (SIS) polymer, a styrene isoprene/butylene styrene polymer, a styrene-ethylene/butylene-styrene (SEBS) polymer, a styrene-ethylene/propylene (SEP) polymer, a chlorinated polyethylene/acrylate (CPE/acrylic) polymer, an acrylonitrile styrene acrylate (ASA) polymer an acrylonitrile ethylene styrene (AES) polymer, and mixtures of two or more of these polymers, and C) an elongation temperer component comprising poly(styrene acrylonitrile) (SAN), an acrylic polymer, a rigid polyvinyl chloride compound, or mixtures of two or more of these polymers.

In one example, certain polyesters useful in the invention are amorphous or semicrystalline. In one example, certain polyesters useful in the invention can have a relatively low crystallinity.

In one example, of the invention, the crystallization half-times are greater than 5 minutes at 170° C., or greater than 1,000 minutes at 170° C., or greater than 10,000 minutes at 170° C.

In one example the stress-resistant component comprises a thermoplastic component having a solubility parameter ranging from about 10.5 to about 14.0 $(cal/cm^3)^{0.5}$ and an elongation modifier at a concentration of up to 38% by weight. For example, a preferred range of concentrations of the elongation modifier component is from about 5%, or about 10%, or about 12%, or about 15% to about 50%, or about 40%, or 35%, by weight.

In one example the coating component further comprises an opacity modifier component.

In one example the coating component further comprises a gloss modifier component.

In one example according to the present invention, the coating component comprises up to about 38% (for example, from about 20%, or from about 25%, or from about 30%, or from about 36%, to 38%, or to 37%, or to 36% by weight) of a thermoplastic component selected from the group consisting of polyesters (for example, polyethylene terephthalate (PET)), polycarbonates, polymethyl methacrylate PMMA), poly(acrylonitrile-styrene-acrylate) (ASA), poly(acrylonitrile-butadiene-styrene) (ABS), and mixtures of two or more of these thermoplastic components; from about 0 wt % to about 15 wt % of an opacity modifier component; and from about 0 wt % to about 40 wt % of a gloss modifier component, wherein the weight percent are based on the total weight of the coating component, wherein the coating component has a percent elongation to break at ambient temperature of between about 131% and about 300%.

In some examples, the elongation modifier component is different from the thermoplastic component.

In another example the present invention provides an article comprising a component having a percent elongation at break of between about 131% and about 300%, said component comprising up to 38% (for example, from about 20%, or from about 25%, or from about 30%, or from about 36%, to 38%, or to 37%, or to 36% by weight) of a thermoplastic component selected from the group consisting of polyesters (for example, a polyethylene terephthalate (PET), polycarbonates, polymethyl methacrylate (PMMA), poly(acrylonitrile-styrene-acrylate) (ASA), poly(acrylonitrile-butadiene-styrene) (ABS), and mixtures of two or more of these thermoplastic components; from about 0 wt % to about 15 wt % of an opacity modifier component; from about 0 wt % to about 40 wt % of a gloss modifier component; and from about 5 wt % to about 50 wt % of an elongation modifier component, wherein the weight percentages are based on the total weight of the coating component.

The present disclosure also provides a coating component having a percent elongation at break of between about 131% and about 300% comprising: 20% by weight to 38% by weight of at least one thermoplastic polymer component; 10% by weight to 40% by weight of an elongation modifier component; 0% by weight to 15% by weight of at least one opacity modifier component; and 0% by weight to 50% by weight of at least one gloss modifier component.

The present disclosure also provides an article comprising a component having a percent elongation at break of between about 131% and about 300%, said component comprising: 20% by weight to 38% by weight of at least one thermoplastic polymer component; 5% by weight to 40% by weight of an elongation modifier component; 0% by weight to 15% by weight of at least one opacity modifier component; and 0% by weight to 50% by weight of at least one gloss modifier component.

The present disclosure also provides an article comprising a component having a percent elongation at break of between about 131% and about 300%, said component comprising: 20% by weight to 38% by weight of at least one copolyester component; 5% by weight to 40% by weight of an elongation modifier component; 1% by weight to 10% by weight of a titanium dioxide; and 1% by weight to 40% by weight of calcium carbonate.

The present disclosure additionally provides a coating component having a percent elongation to break at ambient temperature of between about 131% and about 300% and comprising: 20% by weight to 38% by weight of at least one copolyester component; 5% by weight to 40% by weight of an elongation modifier component; 1% by weight to 10% by weight of a titanium dioxide; and 1% by weight to 40% by weight of calcium carbonate.

In another example the present invention provides an article comprising a coating component comprising PETG, component halogenated polyethylene component having a heat of fusion of about 1 J/g or less; at least one elongation temperer component comprising poly(styrene acrylonitrile) (SAN), an acrylic polymer, a rigid polyvinyl chloride compound, or mixtures of two or more of these polymers, and a substrate at least partially coated with the coating component.

One example according to the present invention comprises an article comprising (a) a substrate comprising a fibrous component at least partially covered with a coating component comprising PETG (polyethylene terephthalate gloycol-modified), a halogenated polyethylene component having a heat of fusion of about 1 J/g or less; at least one elongation temperer component comprising a poly(styrene acrylonitrile)(SAN) component, an acrylic polymer, a rigid polyvinyl chloride compound, or mixtures of two or more of these polymers and wherein the coating component has a percent elongation to break at ambient temperature of between about 131% and about 300%. As used in this application, a "fibrous component" means a narrow, elongated material which, when added to a thermoplastic can increase the toughness and elasticity of the resulting composite material; the fibrous component may, for example, comprise: a cellulosic material (such as wood, wood fiber, cotton, sawdust, hay, nut shells), a carbon fiber, a glass fiber, a keratinic fiber (such as wool), metal, or polymeric fibers (such as aramid fibers) and 5% by weight to 40% by weight of an elongation modifier component.

In one example the article comprises a thermoplastic coating component comprising a thermoplastic component including a polyester having a solubility parameter ranging from about 10.4 to about 11.55 $(cal/cm^3)^0$ and from about 5% by weight to about 40% by weight of at least one elongation modifier component. In one example the elongation modifier component is selected from the group consisting of a substituted or un-substituted polyolefin (including halogenated polyolefins), a plasticized polyvinyl halide, a styrene-butadiene polymer (SBC), a styrene-butadiene-styrene (SBS) polymer, a methacrylate-butadiene-styrene (MBS) polymer, a styrene-butadiene-rubber (SBR) polymer, an enhanced rubber segment (ERS) polymer, a styrene-isoprene (SIS) polymer, a styrene isoprene/butylene styrene polymer, a styrene-ethylene/butylene-styrene (SEBS) polymer, a styrene-ethylene/propylene (SEP) polymer, a chlorinated polyethylene/acrylate (CPE/acrylic) polymer, an acrylonitrile styrene acrylate (ASA) polymer, an acrylonitrile ethylene styrene (AES) polymer, and mixtures of two or more of these polymers. In one example the elongation modifier component is selected from the group consisting of a halogenated polyolefin (such as chlorinated polyethylene) and a styrene-butadiene copolymer (such as styrene-butadiene-styrene (SBS copolymer). Very preferably the elongation modifier has a heat of fusion of about 1 J/g or less.

In one example the present invention provides a method of making an article comprising a substrate comprising a fibrous component at least partially covered with a coating component, wherein the coating component comprises a thermoplastic component comprising a polyester and an elongation modifier component, the method comprising: extruding the coating component wherein the polyester has a solubility parameter ranging from about 9.4 to about 14.0 $(cal/cm^3)^{0.5}$ onto the substrate at a sufficiently low viscosity to coat and bond with the substrate; wherein the thermoplastic component has a Tg greater than about 70° C. and less than about 150° C.; and wherein the coating component has a percent elongation to break at ambient temperature of between about 131% and about 300%.

In one example the present invention provides a method of making an article comprising a stress-resistant component wherein the stress-resistant component comprise a polyester and at least one elongation modifier component, comprising abrading a surface of said article with a blasting media to form an abraded surface.

In one example the present invention provides a method of making an article comprising a stress-resistant component wherein the stress-resistant component comprises a polyester and at least one elongation modifier component, comprising abrading a surface of said article with a blasting media to form an abraded surface, and applying a water-based or non-water-based paint to the abraded surface of said article.

In another example the present invention provides a method of making an article comprising a stress-resistant component wherein the stress-resistant component comprises a stress-resistant component wherein the stress-resistant component comprise wherein the polyester comprises: a polyethylene terephthalic (PET) polymer, and at least one elongation modifier component is selected from the group consisting of a halogenated polyolefin and a styrene-butadiene copolymer.

DETAILED DESCRIPTION OF THE INVENTION

The present invention may be understood more readily by reference to the following detailed description of certain examples of the invention and the working examples.

In accordance with the purpose(s) of this invention, certain examples of the invention are described in the Invention and Background and are further described herein below. Also, other examples of the invention are described herein.

Unless otherwise indicated, the each and every range of values (concentrations, temperatures, and the like) stated in this specification, including the claims, are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10 to three significant figures, for example 1.5, 2.3, 4.57, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Unless otherwise indicated, as used in the specification and the appended claims, the singular forms "a," "an" and "the" include their plural referents unless the context clearly dictates otherwise. For example, reference a "plasticizer," or a "cellulose ester," is intended to include a plurality of plasticizers or cellulose ester.

It is also to be understood that the mention of one or more method steps does not preclude the presence of additional method steps before or after the combined recited steps or intervening method steps between those steps expressly identified. Moreover, although the lettering of process steps or ingredients is sometimes used and is a convenient means for identifying discrete activities or ingredients, the recited lettering can be arranged in any sequence unless otherwise indicated or clear from the context.

Certain examples of the present disclosure provide methods for improving the stress resistance and mechanical properties of an article comprising a thermoplastic extrudate. In certain examples the thermoplastic extrudate may comprise a stress-resistant component comprising at least one thermoplastic polymer and at least one elongation modifier component. For example, the thermoplastic extrudate may be completely or substantially completely comprised of the stress resistant component, or may be partly comprised of the stress resistant component. In certain examples, thermoplastic extrudate may comprise a substrate component and the stress-resistant component may comprise a coating component completely or partly covering the substrate.

When the thermoplastic extrudate comprises a substrate and a coating component, the substrate may be substantially homogeneous; non-exclusive examples of such homogeneous substrates may comprise a substrate made of wood, a metal, a single thermoplastic polymer, or a single "alloy" comprising more than one thermoplastic component. Alternatively, the substrate may be heterogeneous; non-exclusive examples of a heterogeneous substrate may include a laminated substrate, a thermoplastic substrate formed by extrusion and comprising two or more coextruded or substantially coextruded layers, completely or partially filled or hollow substrates, and a composite substrate comprising both a thermoplastic component and a fibrous component, and combinations of these features.

A method of making a stress-resistant component of the present invention may comprise combining at least one thermoplastic component with at least one elongation modifying component, and optionally 1) at least one opacity modifier component; and 2) at least one gloss modifier component.

In a particularly preferred example, the method involves combining the components of a composition comprising a PETG thermopolymer with a halogenated polyethylene having a heat of fusion of 1 J/g or less, and an elongation temperer component comprising one or more of: a poly(styrene acrylonitrile) (SAN) component, an acrylic polymer, a rigid polyvinyl chloride compound, wherein the composition has a percent elongation to break at ambient temperature of between about 131%, or about 200%, or about 230%, to about 300%, or about 275%, or about 260%.

Various batches or preparations of PETG may have different elongation to break moduli. In a preferred example, the PETG elongation to break is about 130%. However, some preparations of PETG may have higher elongation to break moduli, such as about 180% or about 340% or more. Applicants have surprisingly discovered that it is possible to bring the elongation to break modulus of the composition as a whole within the required range of between about 131%, or about 200%, or about 230%, to about 300%, or about 275%, or about 260% by decreasing the concentration of PETG in the formulation and increasing the concentration of the elongation temperer, preferably poly(styrene acrylonitrile)(SAN).

The stress-resistant components according to the present invention may comprise, or are useful in coating, any material capable of being passed through an extrusion die, including thermoplastic extrudates comprising, without limitation, door jambs, window jambs, other door or window parts, decking components, horizontal blinds, indoor shutter parts, flat-panel shelving, pull-trusion articles, interior and exterior molding and trim, and exterior and interior siding. When the stress-resistant component is a coating component, the substrate material to be coated is only limited by the ability of the coating component to adhere thereto during the coating process and may be chosen from, for example and without limitation, MDF, particle board, oriented strand board, fiberglass, natural woods, composite wood products, and synthetic substrates.

In addition, the coating components according to the present invention may permit the use of a less refined substrate surface than that currently used in commercial applications, since defects from the milling process may not be telegraphed through into the primed surface. These coatings may eliminate the need for at least one of sanding or buffing the coated substrate and drying the coated substrate.

The stress-resistant components disclosed herein exhibit enhanced stress resistance and/or mechanical properties for fabrication (cutting, nailing, routing, etc.), while maintaining acceptable visual appearance, including, when desired, one or more parameter selected from the group consisting of opacity, gloss, surface appearance, and surface roughness.

"Enhanced mechanical properties" as used herein refers to ductility, resistance to cracking when subjected to rapid changes in temperature, and ability to deform without cracking or irreversible damage As used herein, "visual appearance" refers to at least one, and preferably two or more of the following properties: opacity, gloss, and surface appearance. "Opacity" as used herein refers to the degree to which light is blocked. Opacity is determined using the method set forth herein. "Gloss" as used herein refers to the degree of surface shininess and is determined using ASTM Test Method D 2457, as set forth below. "Surface appearance," as used herein, refers to visible flaws in the surface of a coating component, including telegraphing of the surface (revelation of structural features of the underlying substrate) and flaws in the surface due to the method of production and/or coating (e.g., bumps due to rollers, etc.). An "impact modifier" has an elongation to break percentage below 131%.

The ability to concurrently provide acceptable appearance, performance, and stress-resistance to extruded materials by the use of an elongation modifier component is an unpredictable property. As for the vast majority of chemical processes, each of the components of an extruded material may, and generally does, influence more than one performance property of the composition. The present inventors have surprisingly discovered that the addition of an elongation modifier component to an extrudate provides thermoplastic component-based compositions with enhanced stress-resistance (crack and shatter resistance due to environmental exposure and fabrication such as e.g. cutting and nailing), enhanced visual appearance, and enhanced mechanical properties for fabrication (ability to be cut, nailed, routed, etc.). This property is very unpredictable, as prior to this invention factors other than the elongation to break parameter, such as modulus of elasticity, tensile strength, and elongation to yield were thought to be sufficient to determine stress resistance, and thus the maximum stress resistance obtained by referring only to these parameters was thought to represent a threshold. The discovery that the addition of effective amounts of at least one elongation-modifying component to a thermoplastic extrudate largely determines the stress resistance of the resulting profile is therefore completely unexpected and new.

The Applicant have surprisingly discovered that the percentage to break modulus of preferred examples of the present composition can be tailored to be within the range of about 131% to about 300%. Applicants have found that compositions having a percentage to break less than about 131% are too soft for structural components, such as fencing, decking, door jambs, horizontal blinds; indoor shutter parts, window jambs, other door/window parts, flat panel shelving, pultrusion articles, exterior moulding and trim, exterior or interior siding and the like. Furthermore, compositions having an elongation to break modulus above about 300% are too brittle to prevent, for example cracking and shattering of coatings made using such compositions.

In preferred examples of the present invention the thermoplastic component comprises PETG, and the elongation modifier comprises a halogenated polyethylene, most preferably, a chlorinated polyethylene, component having a heat of fusion of 12 J/g or less. Additionally, Applicant has found that the addition of poly(styrene acrylonitrile) (SAN), while lowering the concentration of PETG acts to temper the increase of the elongation to break modulus conferred by the halogenated polyethylene. This tempering effect is also anticipated by the Applicant to occur upon addition of an acrylic polymer or a rigid polyvinyl chloride to the mixture. The addition of SAN to the thermoplastic component and the elongation modifier also lowers the temperature of processing to a temperature below about 400 degrees Celsius, relative to an otherwise identical composition lacking the SAN. A lower temperature reduces wear and tear on the extrusion equipment and increases its lifetime.

In examples in which the invention is directed to a coating component and articles made using a coating component, the coating component should exhibit sufficient adhesion to the substrate material. Low adhesion of the coating could lead to delamination during use. Adhesion of the coating to a substrate is a result of two factors: 1) the ability of the coating to wet the surface of the substrate, which is related to solubility parameter interactions and 2) the ability of the coating to flow on and penetrate into the substrate surface. Unlike paint adhesion, where the viscosity of the paint is very low and the solubility parameter interaction is the limiting factor, adhesion of a coating to a substrate will depend on the viscosity of the coating during melt processing. As the coating cools after it leaves the extrusion die, its ability to flow will decrease, and the ability to adhere to the substrate will also decrease. The length of time required for the coating to cool to a temperature and a viscosity that prevents adhesion to the substrate may depend, at least in part, on 1) the relationship of the viscosity of the coating to the processing temperature and 2) temperature of the substrate, as it could potentially absorb a significant amount of heat from the melted coating. Thus, a coating component applied by extrusion should be able to remain sufficiently viscous that it continues to penetrate the surface of the substrate after the extrudate leaves the extrusion die.

Another desired characteristic in a stress-resistant thermoplastic coating component is sufficient mechanical toughness to endure fabrication after its manufacture, such as cutting, nailing, routing, etc.

Certain possible additives to an extrudable stress-resistant component may increase the mechanical toughness of the composition, while others may decrease it. For example, metal salts and other inorganic fillers will tend to make the composition more brittle to varying degrees, depending on the chemical nature and shape of the particles. Increasing particle size and concentration tend to decrease the overall toughness of the composition.

The opacity of a thermoplastic coating component may be affected by 1) the presence or absence of organic or inorganic dyes, 2) the concentration(s) of organic or inorganic dyes, and 3) the thickness of the coating component.

The surface gloss of a thermoplastic coating component may be, and generally is, affected by 1) the presence of agents that disrupt the surface of the composition, even on a microscopic scale, and 2) by the presence of agents that prevent reflection of light from the surface of the composition. Small inorganic particles, such as, for example, talc and calcium carbonate, may be used to modify the surface gloss conferred by a coating component. However, such particles may also affect the polarity of the surface of the composition, the visual appearance and feel of the surface of the composition, and toughness of the composition. For example, generally, the larger the size of the particles, the more visual surface roughness will be observed. On the other hand, the toughness of the composition is generally reduced as the particle size increases.

The surface smoothness of a thermoplastic coating component is a complicated parameter that is influenced by almost all of the possible components of the composition as well as the processing conditions, such as, for example, die or mold design and extruder/injection molder conditions. For example, particles of a gloss or opacity modifier component that do not melt during processing may lead to a rough surface if the processing conditions are not properly set. Further for example, reactive components of the compositions may also affect the resulting surface if they are exposed to extreme processing conditions, such as, for example, high heats and long residence times. The nature of the die or injection mold may also control the resulting surface finish. In general, additives or processing conditions that generate a fluid smooth melt will generate a smooth "attractive surface". Increasing processing temperatures may yield a smoother, lower viscosity melt but limits must be recognized so as to avoid degradation of the composition or overreacting the reactive components.

In certain examples according to the present invention, the coating components of the present disclosure comprise at least one thermoplastic component, at least one elongation modifier component, optionally at least one opacity modifier component, and optionally at least one gloss modifier component. These compositions may exhibit enhanced stress-resistance and mechanical properties for fabrication (cutting, nailing, routing, etc.), while maintaining acceptable visual appearance, including at least one of: opacity, gloss, and surface appearance. In an example, the coating component is not a powder coating component.

In one example the thermoplastic component comprises a polycarbonate.

In one example the thermoplastic component comprises a polymethyl methacrylate.

In one example the thermoplastic component comprises a poly(acrylonitrile-styrene-acrylate).

In one example the thermoplastic component comprises a poly(styrene-acrylonitrile).

In one example the thermoplastic component comprises a cellulose ester.

In one example the thermoplastic component comprises a polyethylene terephthalate.

In one example the thermoplastic component comprises a polyethylene terephthalate glycol-modified (PETG).

In one example according to the present invention, the present disclosure also relates to a coating component comprising (1) about 10% by weight to 38% by weight, relative to the weight of the total composition, of at least one thermoplastic polymer (for example, copolyester or ABS or SAN), (2) about 1% by weight to about 40% by weight, relative to the weight of the total composition, of at least one elongation modifier component (for example, a halogenated polyolefin, such as chlorinated polyethylene), (3) 0% by weight to 50% by weight, relative to the weight of the total composition, of at least one gloss modifier component (for example, calcium carbonate.)

Thermoplastic Component

The at least one thermoplastic component can be any thermoplastic component capable of being melt-processed. For example, the at least one thermoplastic component may be chosen from linear thermoplastic components, branched thermoplastic components, hyperbranched thermoplastic components, and star-shaped thermoplastic components. Non-limiting examples of suitable thermoplastic components include polyesters, copolyesters, acrylics, polycarbonates. Additional non-limiting examples include poly(ethylene terephthalate) (PET), PETG copolyester, and poly(methyl methacrylate) (PMMA), poly(acrylonitrile-styrene-acrylate) (ASA), and poly(acrylonitrile-butadiene-styrene) (ABS), poly(styrene-acrylonitrile) (SAN). Examples of thermoplastic components include, but are not limited to, Eastar copolyester 6763, a PETG available from Eastman Chemical Company; Luran HD, a SAN available from BASF; Terluran GP-22, an ABS available from BASF; Modified Acrylate, a PMMA available from Degussa; and Centrex 833, an ASA available from Lanxess. In certain examples a thermoplastic component is preferably not an elongation modifier component.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols and diols. The term "glycol" as used in this application includes, but is not limited to, diols, glycols, and/or multifunctional hydroxyl compounds. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. Furthermore, as used in this application, the term "diacid" includes multifunctional acids such as branching agents. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

In certain examples according to the present invention, PETG is defined herein as a polyester comprising residues of an aromatic dicarboxylic acid, for example, terephthalic acid, and ethylene glycol and one or more other glycols, for example, ethylene glycol and 1,4-cyclohexanedimethanol. In certain examples of the present invention, PETG comprises from 80 to 100 mole % terephthalic acid, 10 to 60 mole % 1,4-cyclohexanedimethanol and 80 to 40 mole % ethylene glycol, based on the mole percentages for the acid component totaling 100 mole % and the mole percentages for the hydroxyl component totaling 100 mole %, respectively.

Additional non-limiting examples include PETG comprising from 80 to 100 mole % terephthalic acid, 15 to 50 mole % 1,4-cyclohexanedimethanol and 70 to 50 mole % ethylene glycol, based on the mole percentages for the acid component totaling 100 mole % and the mole percentages for the hydroxyl component totaling 100 mole %, respectively.

In certain examples, the stress-resistant component contains (1) at least one thermoplastic component comprising a polyester comprising:

(a) a carboxylic acid component comprising at least 80 mole %, at least 90 mole percent, at least 92 mole percent, at least 93 mole percent, or at least 96 mole percent of the residues of terephthalic acid or derivatives of terephthalic acid, or mixtures thereof, and (b) a hydroxyl component comprising at least 80 mole %, at least 90 mole percent, at least 92 mole percent, at least 93 mole percent, or at least 96 mole percent of the residues of ethylene glycol and 1,4-cyclohexanedimethanol, based on 100 mole percent of carboxylic acid component residues and 100 mole percent of hydroxyl component residues in the polyester polymer, and (2) an elongation modifier component having a percent elongation to break of between about 131% and about 300%, or at least about 200% or at least about 250% or at least about 300% or at least about 400% or at least about 500%, or at least about 600% or at least about 700% or at least about 800% or at least about 900% or at least about 1000%.

In certain examples, the at least one thermoplastic component comprises a polyester comprising:

(a) a carboxylic acid component comprising at least 80 mole %, at least 90 mole percent, at least 92 mole percent, at least 93 mole percent, or at least 96 mole percent of the residues of terephthalic acid or derivatives of terephthalic acid, or mixtures thereof, and (b) a hydroxyl component comprising from 25 to 70 mole percent residues from cyclohexanedimethanol, from 30 to 75 mole percent residues from ethylene glycol, and based on 100 mole percent of carboxylic acid component residues and 100 mole percent of hydroxyl component residues in the polyester polymer.

In another example the present invention provides an article comprising a stress-resistant component comprising (1) at least one thermoplastic component comprising a polyester comprising: (i) an acid component comprising: (a) at least 70 mole % acid residues from terephthalic acid, derivatives of terephthalic acid and mixtures thereof;

(b) from 0 to 30 mole % acid residues from aromatic dicarboxylic acids; and (c) from 0 to 10 mole % acid residues from aliphatic dicarboxylic acids having up to 20 carbon atoms; and (ii) a glycol component comprising: (a) from 20 to 70 mole % glycol residues from cyclohexanedimethanol; (b) from 0 to 80 mole % glycol residues from ethylene glycol; and (c) from 0 to 80 mole % glycol residues from glycols having up to 20 carbon atoms, wherein the acid residues are based on 100 mole % acid residues and the glycol residues are based on 100 mole % glycol residues, and (2) an elongation modifier component having a percent elongation to break of between about 131% and about 300%, or at least about 200% or at least about 250% or at least about 300% or at least about 400% or at least about 500%, or at least about 600% or at least about 700% or at least about 800% or at least about 900% or at least about 1000%.

In another example the present invention provides an article comprising (1) a polyester comprising: (i) an acid component comprising: (a) at least 70 mole % acid residues from terephthalic acid, derivatives of terephthalic acid and mixtures thereof; (b) from 0 to 30 mole % acid residues from aromatic dicarboxylic acids; and (c) from 0 to 10 mole % acid residues from aliphatic dicarboxylic acids having up to 20 carbon atoms; (ii) a glycol component comprising: (a) from 20 to 81 mole % glycol residues from cyclohexanedimethanol; (b) from 0 to 80 mole % glycol residues from ethylene glycol; and (c) from 0 to 80 mole % glycol residues from glycols having up to 20 carbon atoms, wherein the acid residues are based on 100 mole % acid residues and the glycol residues are based on 100 mole % glycol residues, and (2) an elongation modifier component having a percent elongation to break of between about 131% and about 300%, or at least about 200% or at least about 250% or at least about 300% or at least about 400% or at least about 500%, or at least about 600% or at least about 700% or at least about 800% or at least about 900% or at least about 1000/%.

Other examples of copolyesters useful as thermoplastic components in the present invention include Eastar™ copolyester resins, Cadence™ copolyester resins, Provista™ copolyester resins, Durastar™ copolyester resins and Embrace™ copolyesters resins, all available from Eastman Chemical Company in Kingsport, Tenn., USA.

Polycarbonates useful as thermoplastic components in this invention may comprise the divalent residue of dihydric phenols bonded through a carbonate linkage and are represented by structural formulae II and III, as disclosed in e.g., U.S. Patent Publications 2010/0015456; 2013/0005892 and 2013/0011563, each of which publication are fully and individually incorporated by reference herein as part of this specification.

Typical of some of the dihydric phenols which may be employed are bis-phenols such as 2,2-bis-(4-hydroxyphenyl)-propane (bisphenol A), 3,3,5-trimethyl-1,1-bis(4-hydroxyphenyl)-cyclohexane, 2,4-bis-(4-hydroxyphenyl)-2-methyl-butane, 1,1-bis-(4-hydroxyphenyl)-cyclohexane, alpha, alpha'-bis-(4-hydroxyphenyl)-p-diisopropylbenzene, 2,2-bis-(3-methyl-4-hydroxyphenyl)-propane, 2,2-bis-(3-chloro-4-hydroxyphenyl)propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, alpha, alpha'-bis-(3,5-dimethyl-4-hydroxyphenyl)-p-diisopropylbenzene and 4,4'-sulfonyl diphenol. Other dihydric phenols may include hydroquinone, resorcinol, bis-(hydroxyphenyl)-alkanes, bis-(hydroxyphenyl)ethers, bis-(hydroxyphenyl)-ketones, bis-(hydroxyphenyl)-sulfoxides, bis-(hydroxyphenyl)-sulfides, bis-(hydroxyphenyl)-sulfones, and alpha, alpha-bis-(hydroxyphenyl)diisopropylbenzenes, as well as their nuclear-alkylated compounds. These and further suitable dihydric phenols are described, for example, in U.S. Pat. Nos. 2,991,273; 2,999,835; 2,999,846; 3,028,365; 3,148,172; 3,153,008; 3,271,367; 4,982,014; 5,010,162 all incorporated herein by reference. The polycarbonates of the invention may include in their structure, units derived from one or more of the suitable bisphenols. The most preferred dihydric phenol is 2,2-bis-(4-hydroxyphenyl)-propane (bisphenol A).

The polycarbonates useful in the polyester compositions which are useful as thermoplastic components in the invention also may be copolyestercarbonates such as those described in U.S. Pat. Nos. 3,169,121; 3,207,814; 4,194,038; 4,156,069; 4,430,484, 4,465,820, and 4,981,898, the disclosure regarding copolyestercarbonates from each of them is incorporated by reference herein.

Copolyestercarbonates useful as thermoplastic components in this invention can be available commercially or can be prepared by known methods in the art. For example, they are typically obtained by the reaction of at least one dihydroxyaromatic compound with a mixture of phosgene and at least one dicarboxylic acid chloride, especially isophthaloyl chloride, terephthaloyl chloride, or both.

Inherent Viscosity

In certain examples of the present invention, the thermoplastic component(s), particularly the polyesters, have inherent viscosity (I.V.) values in the range of 0.5 dL/g to 1.4 dL/g measured at 25° C. in 60/40 wt/wt phenol/tetrachloroethane. In other examples of the present invention, the thermoplastic component has an I.V. ranging from 0.65 dL/g to 1.0 dL/g, or 0.65 dL/g to 0.85 dL/g or 0.69 dL/g to 0.82 dL/g. For other examples of the invention, the thermoplastic components useful in the invention may exhibit at least one of the following inherent viscosities as determined in 60/40 (wt/wt) phenol/tetrachloroethane at a concentration of 0.5 g/100 ml at 25° C.: 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; 0.65 to less than 0.70 dL/g; 0.68 to 1.2 dL/g; 0.68 to 1.1 dL/g; 0.68 to 1 dL/g; 0.68 to less than 1 dL/g; 0.68 to 0.98 dL/g; 0.68 to 0.95 dL/g; 0.68 to 0.90 dL/g; 0.68 to 0.85 dL/g; 0.68 to 0.80 dL/g; 0.68 to 0.75 dL/g; 0.68 to less than 0.75 dL/g; 0.68 to 0.72 dL/g; greater than 0.76 dL/g to 1.2 dL/g; greater than 0.76 dL/g to 1.1 dL/g; greater than 0.76 dL/g to 1 dL/g; greater than 0.76 dL/g to less than 1 dL/g; greater than 0.76 dL/g to 0.98 dL/g; greater than 0.76 dL/g to 0.95 dL/g; greater than 0.76 dL/g to 0.90 dL/g; greater than 0.80 dL/g to 1.2 dL/g; greater than 0.80 dL/g to 1.1 dL/g; greater than 0.80 dL/g to 1 dL/g; greater than 0.80 dL/g to less than 1 dL/g; greater than 0.80 dL/g to 1.2 dL/g; greater than 0.80 dL/g to 0.98 dL/g; greater than 0.80 dL/g to 0.95 dL/g; greater than 0.80 dL/g to 0.90 dL/g.

Solubility Parameter

In an example, either or both the stress resistant component and the thermoplastic component(s), has a solubility parameter ranging from 10.4 to 11.5 $(cal/cm^3)^{0.5}$. In other examples of the present invention the solubility parameter ranges from about 9.4 to about 14.0 $(cal/cm^3)^{0.5}$ or from about 10.0 to about 13.6 $(cal/cm^3)^{0.5}$ or about 10.0 to about 12.5 $(cal/cm^3)^{0.5}$ or about 10.4 to about 11.2 $(cal/cm^3)^{0.5}$.

Certain examples also exhibit excellent toughness and a relatively low processing temperature.

Glass Transition Temperature (Tg)

In certain examples, either or both the stress resistant component and the thermoplastic component(s) may have glass transition temperature ranging from 60° C. to about 150° C. or from about 70° C. to about 130° C. or about 75° C. to about 115° C. In other examples, the thermoplastic component has a glass transition temperature ranging from 70 to about 150° C. or from 80 to about 150° C. or from 90 to about 150° C. or from 100 to about 150° C. or from 110 to about 150° C. or from 120 to about 150° C. or From 130 to about 150° C. or from 140 to about 150° C. or from 70 to about 140° C. from 80 to about 140° C. or From 90 to about 140° C. or from 100 to about 140° C. or from 110 to about 140° C. or from 120 to about 140° C. or from 130 to about 140° C. or 70 to about 130° C. from 80 to about 130° C. or from 90 to about 130° C. or from 100 to about 130° C. or from 110 to about 130° C. or from 120 to about 130° C. or from 110 to about 120° C. or 70 to about 120° C. from 80 to about 120° C. or from 90 to about 120° C. or from 100 to about 120° C. or 70 to about 110° C. from 80 to about 110° C. or from 90 to about 110° C. or from 100 to about 110° C. or 70 to about 100° C. from 80 to about 100° C. or from 90 to about 100° C. or 70 to about 90° C. from 80 to about 90° C.

In other examples, either or both the stress resistant component and the thermoplastic component(s) has a Tg ranging from 60 to 150° C. or 70 to 130° C. or 75 to 115° C. It is contemplated that compositions useful in the stress-resistant thermoplastic articles of the invention can possess at least one of the inherent viscosity ranges described herein and at least one of the monomer ranges for the compositions described herein unless otherwise stated. It is also contemplated that compositions useful in the stress-resistant thermoplastic articles of the invention can possess at least one of the Tg ranges described herein and at least one of the monomer ranges for the compositions described herein unless otherwise stated. It is also contemplated that compositions useful in the stress-resistant thermoplastic articles of the invention can posses at least one of the inherent viscosity ranges described herein, at least one of the Tg ranges described herein, and at least one of the solubility parameter ranges described herein unless otherwise stated.

Weight Percent Thermoplastic Component

In one example, the stress-resistant component of the invention may comprise up to 38% by weight, with respect to the total weight of the composition, of at least one polyester thermoplastic component; additionally, the stress-resistant component may contain from about 1% by weight to about 50% by weight of at least one elongation modifier component.

In certain examples, the stress-resistant components may comprise about 30% by weight to about 95% by weight, with respect to the total weight of the composition, of at least one thermoplastic component other than a polyethylene terephthalate (PET)-based thermoplastic component. In, certain examples, the stress-resistant components may comprise from about 25% by weight to 38% by weight, or from about 30% by weight to 37% by weight, or from about 30% by weight to 36% by weight, with respect to the total weight of the composition, of a polyethylene terephthalate (PET)-based thermoplastic component (such as PETG), and from about 1% by weight to about 25% by weight of at least one elongation modifier component. In certain examples, the stress-resistant components may comprise 30% by weight to 80% by weight, with respect to the total weight of the composition, of one or more one thermoplastic component, and from about 1% by weight to about 25% by weight of at least one elongation modifier component. In certain examples, the stress-resistant components may comprise 30% by weight to 70% by weight, with respect to the total weight of the composition, of one or more thermoplastic component, provided the stress-resistant component comprises no more than about 38% by weight of a polyethylene terephthalate (PET)-based thermoplastic component, or no more than 37% by weight of a polyethylene terephthalate (PET)-based thermoplastic component, or no more than 36% by weight of a polyethylene terephthalate (PET)-based thermoplastic component. In certain examples, the stress-resistant components may comprise 30% by weight to 60% by weight, with respect to the total weight of the composition, of one or more thermoplastic component, and from about 1% by weight to about 20% by weight of at least one elongation modifier component. In certain examples, the stress resistant components may comprise 30% by weight to 50% by weight, with respect to the total weight of the composition, of at least one thermoplastic component, and from about 1% by weight to about 50% by weight of at least one elongation modifier component.

Elongation Temperer Component

The elongation temperer component may comprise one or more of a poly(styrene acrylonitrile)(SAN) component, an acrylic polymer, and a rigid polyvinyl chloride compound. In certain examples, the stress resistant components may comprise about 20% by weight, or about 25% by weight, or about 30% by weight, to about 60% by weight, or about 55% by weight, or about 50% by weight, with respect to the total weight of the composition, of an elongation temperer component.

Opacity Modifier Component

The at least one opacity modifier component may be chosen from organic dyes and inorganic dyes. Such opacity modifier components may impart at least one of opacity and color to the coating formulations. Non-limiting examples of suitable opacity modifier components include metal oxides and metal salts, such as, for example, zinc oxide (ZnO), mica, white lead, barium sulfate (BaSO$_4$), zinc sulfide (ZnS), antimony oxide and titanium dioxide (TiO$_2$). The compositions according to the present disclosure may comprise about 1% by weight to about 15% by weight, with respect to the total weight of the composition, of at least one opacity modifier component. In an example, the coating components comprise about 2% by weight to about 12% by weight, with respect to the total weight of the composition, of at least one opacity modifier component. In an example, the coating components comprise about 3% by weight to about 10% by weight, with respect to the total weight of the composition, of at least one opacity modifier component. In an example, the coating components comprise about 4% by weight to about 7% by weight, with respect to the total weight of the composition, of at least one opacity modifier component. In an example, the coating components comprise 5% by weight to 7% by weight, with respect to the total weight of the composition, of at least one opacity modifier component. In an example, the coating components comprise 5% by weight to 6% by weight, with respect to the total weight of the composition, of at least one opacity modifier component. In certain examples, the stress-resistant component of the invention may not contain an opacity modifier component.

Gloss Modifier Component

The at least one optional gloss modifier component may be chosen from inorganic fillers and polymeric fillers. Non-limiting examples of suitable inorganic fillers include talc (magnesium silicate), silica, kaolin clay, alumina and calcium carbonate (CaCO$_3$).

Examples of polymeric fillers include, but are not limited to, BMAT available from Chemtura, Ecdel elastomers available from Eastman Chemical Company and KM-377 available from Rohm and Haas. The at least one optional gloss modifier component may impart little or no graying or yellowing to the formulation. The median particle size of the at least one optional gloss modifier component may range from less than 1 micron to 50 microns, such as, for example, 3 microns to 20 microns. In certain examples, the at least one optional gloss modifier component has a median particle size ranging from 5 microns to 50 microns. In certain examples, the at least one optional gloss modifier component has a median particle size ranging from 1 microns to 50 microns, such as from 1 microns to 40 microns, from 1 microns to 30 microns, or from 1 microns to 20 microns. In certain examples, the at least one optional gloss modifier component has a median particle size ranging from 3 microns to 50 microns, such as from 3 microns to 40 microns, 3 microns to 30 microns, or 3 microns to 20 microns. In certain examples, the at least one optional gloss modifier component has a median particle size ranging from 5 microns to 50 microns, such as from 5 microns to 40 microns, from 5 microns to 30 microns, or from 5 microns to 20 microns. In certain examples, the at least one optional gloss modifier component has a median particle size ranging from 10 microns to 50 microns, such as from 10 microns to 40 microns, from 10 microns to 30 microns or from 10 microns to 20 microns. In certain examples, the stress-resistant component of the invention may not contain a gloss modifier component.

Additional Additives

In addition, it is possible that a variety of other application-specific additives could be used. Such additional additives may include, but are not limited to, flame retardants, UV absorbers, antioxidants, colorants, and optical brighteners. Generally, for polymeric formulations that are to be used as primers, an opaque white coloring is desired. Titanium dioxide a widely used white pigment, but a variety of other metal oxides and salts may be used.

Applications for the coating formulations are only limited by the ability to melt process the composition into the desired form or article. The choice of base resins will be dictated by the use conditions such as temperature resistance, toughness, weathering, etc. The present composition may be used with extrusion technology such as that disclosed in U.S. Pat. Nos. 6,660,086 and 7,374,795. It is envisioned that the stress-resistant coating components could be used for coating any linear profile material. Such coating applications that one might anticipate are simple extensions of the technology to door jambs, window jambs, other door/window parts, flat panel shelving, pull-trusion article, exterior moulding and trim, exterior or interior siding. The substrate material could potentially be MDF, particle board, oriented strand board, fiberglass, natural woods, other composite wood products, and synthetic substrates. The substrate material is only limited by the ability of the formulation to adhere during the coating process. It is natural to assume that these articles could find use in both interior and exterior applications.

The stress-resistant component of the present invention may also include a colored pigment added to the formulation to produce finished articles with a desired color or design that may be painted at a later date if so desired.

The stress-resistant components of this invention can be produced using conventional compounding techniques familiar to those skilled in the art. The formulations can be produced using both continuous and batch-wise processes. The preferred compounding apparatus is usually a twin screw extruder type system with multiple feed ports for the different additives. It is also conceivable that a single screw extrusion system, for example, one with a specifically designed mixing screw, could be used to produce the formulations of the invention. In addition to compounding the complete formulation, it is conceivable to produce single component concentrates using similar compounding techniques and perform pellet-pellet blending of the concentrates to produce the final formulation. These pellet-pellet blends would be fully compounded during the extrusion process.

The formulations can be produced through melt blending of the specified components in a thermoplastic matrix through high shear dispersion and mixing such as provided through twin screw compounding, single screw compounding, planetary mixing or a continuous mixer operation. The additives, at least one thermoplastic, at least one opacity modifier component, and optionally at least one gloss modifier component are fed at appropriate ratios into the mixing equipment. In the twin and single screw systems, the formulated polymer strands are passed through a water bath to quench the formulated polymer melt. These quenched strands were run through a pelletizer and cut into polymer pellets of a controlled size. Other methods are known for quenching pellet strands such as chilled belts, chilled air, etc. Another method of producing said compounded additives is by first extruding into a film or sheet thru an extrusion process and grinding said film or sheet to the desired particle size. These methods are known to those skilled in the art.

Exemplary Articles

One example according to the present invention comprises an article comprising a substrate at least partially covered with a stress-resistant component coating, wherein the thermoplastic component has a solubility parameter ranging from about 9.4 to about 14.0 $(cal/cm^3)^{0.5}$; and an elongation modifier component, wherein the coating is an extruded coating and wherein the thermoplastic component has a Tg greater than about 60° C. and less than about 150° C. In certain examples of the present invention, the thermoplastic component is selected from the group consisting of polyesters such as poly(ethylene terephthalate) glycol-modified (PETG), polycarbonates, polymethyl methacrylate (PMMA), poly(acrylonitrile-styrene-acrylate) (ASA) poly(acrylonitrile-butadiene-styrene) (ABS), poly(styrene-acrylonitrile) (SAN), cellulose ester and mixtures thereof. In certain examples, the substrate comprises MDF, particle board, oriented strand board, fiberglass, natural woods, composite wood products, and synthetic substrates. Alternatively, the Tg of the resin ranges from about 70° C. to about 150° C., or about 70° C. to about 130° C., or about 75° C. to about 115° C. Alternatively, the solubility parameter for a polycarbonate resin of about 10.8 $(cal/cm^3)^{0.5}$. Alternatively, the solubility parameter for a SAN resin, with 32% acrylonitrile, of about 9.7 $(cal/cm^3)^{0.5}$. Alternatively, the solubility parameter for a PMMA resin of about 9.45 $(cal/cm^3)^{0.5}$. In one example the elongation modifier component is selected from the group consisting of a substituted or un-substituted polyolefin (including halogenated polyolefins), a plasticized polyvinyl halide, a styrene-butadiene polymer (SBC), a styrene-butadiene-styrene (SBS) polymer, a methacrylate-butadiene-styrene (MBS) polymer, a styrene-butadiene-rubber (SBR) polymer, an enhanced rubber segment (ERS) polymer, a styrene-isoprene (SIS) polymer, a styrene isoprene/butylene styrene polymer, a styrene-ethylene/butylene-styrene (SEBS) polymer, a styrene-ethylene/propylene (SEP) polymer, a chlorinated polyethylene/acrylate (CPE/acrylic) polymer, an acrylonitrile styrene acrylate (ASA) polymer, an acrylonitrile ethylene styrene (AES) polymer, and mixtures of two or more of these polymers. In preferred examples, the elongation modifier component has a heat of fusion of 1 J/g or less.

One example of the present invention comprises a stress resistant component comprising from 25 wt % to about 100 wt %, based on the total weight of the composition, of a thermoplastic component selected from the group consisting of copolyesters such as poly(ethylene terephthalate) glycol-modified (PETG), polycarbonates, polymethyl methacrylate (PMMA), poly(acrylonitrile-styrene-acrylate) (ASA), poly(acrylonitile-butadiene-styrene) (ABS), poly(styrene-acrylonitrile) (SAN) and mixtures thereof, from about 5% to about 40%, based on the total weight of the composition, of an elongation modifier component, from about 30% by weight to about 50% by weight, based on the total weight of the composition, of an elongation temperer component, from about 0 wt %, to about 15 wt % based on the total weight of the composition, of an opacity modifier component, from about 0 wt % to about 40 wt %, based on the total weight of the composition, of a gloss modifier component, wherein the coating is an extruded coating; wherein the thermoplastic component has a solubility parameter ranging from about 9.4 to about 14.0 $(cal/cm^3)^{0.5}$; and wherein the thermoplastic component has a Tg greater than about 70° C. and less than about 150° C.; and wherein the elongation modifier component has a heat of fusion of 1 J/g or less and is selected from the group consisting of any one or more of: a substituted or un-substituted polyolefin (including halogenated polyolefins), a plasticized polyvinyl halide, a styrene-butadiene polymer (SBC), a styrene-butadiene-styrene (SBS) polymer, a methacrylate-butadiene-styrene (MBS) polymer, a styrene-butadiene-rubber (SBR) polymer, an enhanced rubber segment (ERS) polymer, a styrene-isoprene (SIS) polymer, a styrene isoprene/butylene styrene polymer, a styrene-ethylene/butylene-styrene (SEBS) polymer, a styrene-ethylene/propylene (SEP) polymer, a chlorinated polyethylene/acrylate (CPE/acrylic) polymer, an acrylonitrile styrene acrylate (ASA) polymer, an acrylonitrile ethylene styrene (AES) polymer, and mixtures of two or more of these polymers.

Extrusion

The extrusion process may be a cross-head die process, for example, as disclosed in U.S. Pat. No. 6,660,086 B1, which is incorporated by reference.

When the stress-resistant component is used as a coating component, a coating extrusion method may apply a polymer coating to a substrate in a uniform and controlled manner. The coating extrusion apparatus may comprise a feeding stage, an optional pre-treatment stage, at least one coating extrusion stage and a finishing stage. The coating stage(s) may comprise a polymer feeder and a polymer coating extrusion device. The polymer coating extrusion device may include an aperture or die conforming to the perimeter of a substrate to be completely or partially coated with the extruded polymer. As the substrate passes through the aperture or die, polymer coating material is applied in a uniform and consistent layer typically ranging from 0.001 inch to 0.250 inch. In some examples, the polymer coating material also fills minor surface imperfections and blemishes on the substrate to achieve a consistent finish across the whole area where polymer coating material is applied.

EXEMPLARY FORMULATIONS

Formulation 1

Table 1 is a table of abbreviations of various exemplary ingredients:

TABLE 1

| Name | Trade Name | Composition | Purpose |
|---|---|---|---|
| C-209 | | Chlorinated polyethylene | Elongation modifier |
| C-202 | | Chlorinated polyethylene | Elongation modifier |
| TR251 | Struktol TR 251 | Complex oleochemical mixture containing mono- and di- amides and metal soap | Lubricant |
| EBS Wax | Struktol | Monotanic ester wax | Lubricant |
| TR044 | Strokol TR 044W | Blend of fatty acids | Lubricant |
| TR071 | Strukol | Blend of fatty acids | Lubricant |
| 401P | Advera 401P Aluminosilica | Sodium aliminosilicate | Stabilizer |
| PP-18 | Anox PP 18 Powder | Octadecyl-3-(3',5'-di-tert-butyl-4'-hydroxyphenyl) propionate | Phosphite antioxidant (UV) |
| TiO$_2$ | | Titanium dioxide | Opacity modifier |
| M-300 | Kane Ace M-300 | Polymethylmethacrylate, butadiene, styrene, acrylic copolymer | Impact modifier |
| Mica-tan | | Crystalline silica | Filler |
| Mica-white | | Crystalline silica | Filler |
| 626 | Ultranox 626 | 3-9-bis (2-4-di-tert-butyl-phenoxy)-2,4,8,10-tetraoxa-3,93di-phosphaspiro[5-5]undecane | Phosphite antioxidant (UV) |
| 619 | Weston 619F | Triisopropanolamine | UV absorber |
| T-770 | Lowlite 77 Micropellets | Hindered amine light stabilizers | UV absorber |
| T-P | Lowlite 55 | 2-(2'-hydroxy-5'-methyl-phenyl) benzotriazole | UV absorber |
| PETG | | Glycolated Polyethylene terphthalate | Thermoplastic component |
| Acrylic | Optix CA-41 Clear | Polymethyl methacrylate, methyl methacrylate | Thermoplastic component |
| Calcium carbonate | | Calcium carbonate | Filler |
| SBC clear | | Styrene-butadiene-copolymer | Elongation modifier |
| SBS | | Styrene-butadiene-styrene copolymer | Elongation modifier |
| SAN | | Poly (stytene-acrylonitrile) | Thermoplastic component |
| Wax OP | Struktol Montan Wax OP | Partially saponified montanic ester wax | Lubricant |
| Blue pellets | | Blue pigment, Polyethylene terphthalate | Tint |

The following ingredients are combined and mixed before being fed into one of two screw extruders of a twin screw extruder.

Formulation 1

| Name | Percentage by weight |
|---|---|
| SAN | 29.5% |
| PETG | 35% |
| C-202 | 20% |
| Mica | 12% |
| TR251 | 0.5% |
| EBS Wax | 0.5% |
| PP-18 | 0.1% |
| TiO$_2$ | 2.0% |
| 626 | 0.4% |

* In some other preferred examples SAN may be present at a weight percentage of from about 25% to about 35%; PETG may be present at a weight percentage of from about 25% to 35%; halogenated polyolefin such as C-202 may be present at a weight percentage of from about 15% to about 25%; and the individual weight percentages of mica and TiO$_2$ may vary, with the combined weight percentages of mica and TiO$_2$ preferably about 14%.

Example 1: Test Profile

A test run is performed using a 2½ inch core extruder having a 24:1 length to diameter (L/D) ratio, and a 2 inch cap extruder having a 20:1 L/D ratio. The cap mix has a melting point of between 325° F. to 400° F. and is present in an amount of between 0.1% and 10% by weight of the finished coated profile. The core (substrate) mix contains 60% ABS and 40% wood flour.

The cap extruder output is fed into the core extruder at the gate, located upstream of the die, in a fashion permitting the core to become encapsulated in the capstock before the extrudate is shaped by the die. A die is used that would shape the extrudate to form window trim materials.

Temperature parameters are as follows; the indicated locations are set forth in order from the extruder input (Zone 1), to the output (Die 6):

| Substrate (core) extruder (15 rpm) | | Cap (coating) extruder (20 rpm) | |
|---|---|---|---|
| Location | Temperature (° F.) | Location | Temperature (° F.) |
| Zone 1 | 340 | Zone 1 | 270 |
| Zone 2 | 340 | Zone 2 | 280 |
| Zone 3 | 345 | Zone 3 | 290 |
| Zone 4 | 350 | Zone 4 | 290 |
| GATE | 330 | Adaptor | 290 |
| Die | 345 | | |
| Die | 345 | | |
| Die | 345 | | |
| Die | 345 | | |
| Die | 345 | | |
| Die | 340 | | |

The resulting extrudate is cooled and cut into lengths. The resulting window trim profile is encapsulated on top, bottom and the two sides by the stress-resistant coating component.

While this example employs a particular formulation for a stress resistant component used as a coating component, those of ordinary skill in the art will recognize in view of the disclosure of the present specification that many other options exist for the formulation of a stress resistant component.

Similarly, the substrate chosen for this example may be substituted with any suitable substrate, such as those previously mentioned herein. If the substrate comprises a thermopolymer as in Example 1, the substrate component mix may comprise a thermoplastic polymer, and preferably a filler. The thermopolymeric component may comprise acrylonitrile/styrene/acrylic polymeric materials, acrylonitrile/butadiene/styrene polymeric materials, poly(styrene-acrylonitrile) materials, PVC polymeric materials, acrylic polymeric materials, acrylonitrile/ethylene/propylene/styrene polymeric materials, polycarbonate polymeric materials, polyolefins (such as polypropylene polymeric materials, polystyrene polymeric materials, and/or polyethylene polymeric materials), polyacetyl materials, fluorocarbon polymeric materials, nylons, phenoxy polymeric materials, polyethers, polycarbonates, polyphenylene oxides, polysulfones, polyimides, thermoplastic urethane elastomers, combinations thereof or mixtures or alloys thereof. If a filler is also included in the substrate component dry mix, the filler may comprise wood (for example, without limitation, wood fiber, wood flour or sawdust), other organic fiber (such as, without limitation, coconut fiber, husks, nutshells, hemp, straw and the like), glass fiber (including random fibers, chopped fiber, glass mat or any other glass fiber-containing composition), mica, other inorganic fibers, metal shavings, talc and the like, and combinations thereof. If wood, the filler may be derived from a hardwood, a softwood, or a mixture of the two. If a filler is used, it is added in an amount between about 1% and about 65% by weight, depending in part on the nature of the filler.

Example 2: Water Immersion Stress Test

The coated window trim profile made in Example 1 is cut into a one toot length, then immersed in water for 48 hours. The profile is not coated on front or rear surfaces, and water is permitted to enter the substrate core through these surfaces. The wood flour within the core swells upon absorption of water, greatly distending top and bottom coated surfaces of the coated profile outward. The profile is then dried by exposure to direct sunlight at an air temperature of about 90° F. to about 100° F. in a low humidity environment, until the top and bottom coated surfaces are again substantially level and parallel.

The coated extrudate is inspected for cracking or splintering upon cutting the profile, after 48 hours immersion in water, and after complete drying in sunlight. No significant splintering occurs upon sawblade cutting of the profile. Additionally, no cracking, fracturing or "delamination" of the coated surfaces of the profile occur upon swelling in water or subsequent drying.

Example 3: Control Profile

As a control, a coated profile is made using a coating component identical to Formulation 1, but wherein the elongation modifier is omitted, and substituted with PETG. The coating process is exactly as set forth in Example 1.

An identically sized, cut segment of the resulting control profile is then subjected to the stress test of Example 2.

While no significant splintering occurs upon sawblade cutting of the profile, several small cracks form in the coating layer of the profile upon water immersion for 48 hours. Additional and/or extended fracturing of the coating occurs upon sun drying of the profile.

Example 4: Freezing Stress Test

Freshly cut lengths of the profile from Example 1 and the control profile of Example 3 are placed in a freezer at −70° F. overnight. Each profile is then taken from the freezer and a nail is punched through it using a nail gun.

The surface coating of the frozen profile piece from Example 1 remains smooth and uncracked after the nail is punched through the profile. By contrast, the portion of the coating of the frozen control profile nearest the nailing site is cracked and splintered.

Example 5: Tailoring the Elongation to Break Modulus

Three batches of the thermoplastic component PETG have different elongation to break moduli of 130%, 180% and 340%. The desired elongation to break modulus of the composition as a whole is between about 230% and about 250%. The desired elongation to break (ETB) modulus is achieved by combining and mixing each of the three compositions, Formulations A, Formulation B and Formulation C, as shown below, then creating test profiles, as described above.

| Ingredients | Formulation A PETG ETB = 130% | Formulation B PETG ETB = 180% | Formulation C PETG ETB = 340% |
|---|---|---|---|
| SAN | 29.5% | 39.5% | 49.5% |
| PETG | 35.0% | 25.0% | 15% |
| C-202 CPE (Heat of fusion: 1 J/g or less) | 20% | 20% | 20% |
| Mica | 12.0% | 12.0% | 12.0% |
| EBS Wax | 0.5% | 0.5% | 0.5% |
| Struktol 251 | 0.5% | 0.5% | 0.5% |
| TiO$_2$ | 2.0% | 2.0% | 2.0% |
| PP18, 1076 | 0.1% | 0.1% | 0.1% |
| Ultranox 626 | 0.4% | 0.4% | 0.4% |
| ETB Modulus of Composition as a Whole (%) | 253% | 253% | 259% |

Each and every patent, patent application and other publication cited or referenced in this patent application is hereby incorporated by reference in its entirety as a part of this specification.

It will be understood that the present invention has been described in this specification with reference to specific features, embodiments and examples, but that the scope of the invention is defined solely by the claims that conclude this specification. Any feature or features described with respect to one or more particular embodiment of the invention may be combined in any operable combination, and similarly, any feature may be omitted or substituted with another suitable feature without departing from the scope of the invention unless specifically stated.

The invention claimed is:
1. An extrudable thermoplastic composition comprising:
   a) about 64.5% by weight of a thermoplastic component comprising from about 15% to about 35% by weight of a PETG copolyester, and about 29.5% to about 49.5% by weight of a poly(styrene acrylonitrile) (SAN) copolymer, wherein the combined weight percentage of the PETG copolyester and the SAN copolymer in the composition is about 64.5%, and
   b) about 20% by weight of an elongation modifier consisting of a chlorinated polyethylene having a heat of fusion of 1 J/g or less,
   c) about 12% by weight of a filler, and
   d) about 3.5% by weight of one or more components selected from the group consisting of a second elon- gation modifier, a lubricant, a stabilizer, an antioxidant, a UV absorber, an opacity modifier, an impact modifier and a tint;

the composition having a percent elongation to break between 131% and 300%, the composition being extrudable in an article selected from the group consisting of a door jamb, a window jamb, door trim, window trim, a decking component, shelving parts, horizontal blinds, indoor shutter parts, a pull-trusion article, interior molding, exterior molding, interior trim, exterior trim, exterior siding and interior siding, said article having enhanced resistance to moisture and/or temperature mediated cracking-relative to an otherwise identical article made using an otherwise identical composition in which the elongation modifier component is omitted and substituted with PETG.

2. The composition of claim 1 in which said composition is extrudable into an article having at least one of: a) enhanced crack and shatter resistance due to environmental exposure and fabrication, b) enhanced visual appearance, and c) enhanced mechanical properties relative to an otherwise identical article made using an otherwise identical composition in which the elongation modifier component is omitted and substituted with PETG.

3. An article at least partially covered with a coating composition comprising:
   a) about 64.5% by weight of a thermoplastic component comprising from about 15% to about 35% by weight of a PETG copolyester, and about 29.5% to about 49.5% by weight of a poly(styrene acrylonitrile) (SAN) copolymer, wherein the combined weight percentage of the PETG copolyester and the SAN copolymer in the composition is about 64.5%, and
   b) about 20% by weight of an elongation modifier consisting of a chlorinated polyethylene having a heat of fusion of 1 J/g or less; and
   c) about 12% by weight of a filler, and
   d) about 3.5% by weight of one or more components selected from the group consisting of a second elongation modifier, a lubricant, a stabilizer, an antioxidant, a UV absorber, an opacity modifier, an impact modifier and a tint;

said composition having a percent elongation to break of at least 131% and not above about 300%, wherein said at least partially coated article is selected from the group consisting of a door jamb, a window jamb, door trim, window trim, a decking component, shelving parts, horizontal blinds, indoor shutter parts, a pulltrusion article, interior molding, exterior molding, interior trim, exterior trim, exterior siding and interior siding, said article having enhanced resistance to moisture and/or temperature mediated cracking relative to an otherwise identical article made using an otherwise identical coating composition in which the elongation modifier component is omitted and substituted with PETG.

4. The article of claim 3 comprising a substrate core at least partially covered with said coating composition.

5. The article of claim 4, produced by co-extrusion of said substrate core and said coating composition.

6. The article of claim 4 wherein said substrate core comprises a material selected from the group consisting of medium density fiberboard (MDF), particleboard, oriented strand board, fiberglass, a natural wood, a composite wood product, and a synthetic substrate.

7. The article of claim 5 which is at least partially painted with an oil-based or water-based paint.

8. An extrudable thermoplastic composition comprising:
   a) about 64.5% by weight of a thermoplastic component comprising about 35% of a PETG copolyester and about 29.5% of a poly(styrene acrylonitrile) (SAN) copolymer, and
   b) about 20% by weight of an elongation modifier consisting of a chlorinated polyethylene having a heat of fusion of about 1 J/g or less,
   c) about 12% by weight of a filler, and
   d) about 3.5% by weight of one or more components selected from the group consisting of a second elongation modifier, a lubricant, a stabilizer, an antioxidant, a UV absorber, an opacity modifier, an impact modifier and a tint the composition having a percent elongation to break between 131% and 300%, the composition being extrudable as a coating composition in an article having enhanced resistance to moisture and/or temperature mediated cracking relative to an otherwise identical article made using an otherwise identical coating composition in which the elongation modifier component is omitted and substituted with PETG.

9. An extrudable thermoplastic composition comprising:
   i) about 29.5% of a poly(styrene acrylonitrile) (SAN) polymer;
   ii) about 35% by weight of a PETG copolyester, and
   iii) about 20% by weight of an elongation modifier component consisting of comprising a chlorinated polyethylene having a heat of fusion of 1 J/g or less,
   iv) about 12% by weight of a filler, and
   v) about 3.5% by weight of one or more components selected from the group consisting of a second elongation modifier, a lubricant, a stabilizer, an antioxidant, a UV absorber, an opacity modifier, an impact modifier and a tint;

the composition having a percent elongation to break of at least 131% and not above about 300%, the composition being extrudable into an article selected from the group consisting of a door jamb, a window jamb, door trim, window trim, a decking component, shelving parts, a pulltrusion article, interior molding, exterior molding, interior trim, exterior trim, exterior siding and interior siding, said article having enhanced resistance to moisture and/or temperature mediated cracking relative to an otherwise identical article made using an otherwise identical composition in which the elongation modifier component is omitted and substituted with PETG.

* * * * *